S. W. SHELDON.
Broom-Rack.

No. 196,599. Patented Oct. 30, 1877.

WITNESSES:
H. Rydquist.
J. H. Scarborough

INVENTOR:
S. W. Sheldon
BY Munn & Co
ATTORNEYS.

UNITED STATES PATENT OFFICE.

SYLVESTER W. SHELDON, OF NEW YORK, N. Y.

IMPROVEMENT IN BROOM-RACKS.

Specification forming part of Letters Patent No. 196,599, dated October 30, 1877; application filed September 22, 1877.

*To all whom it may concern:*

Figure 1:
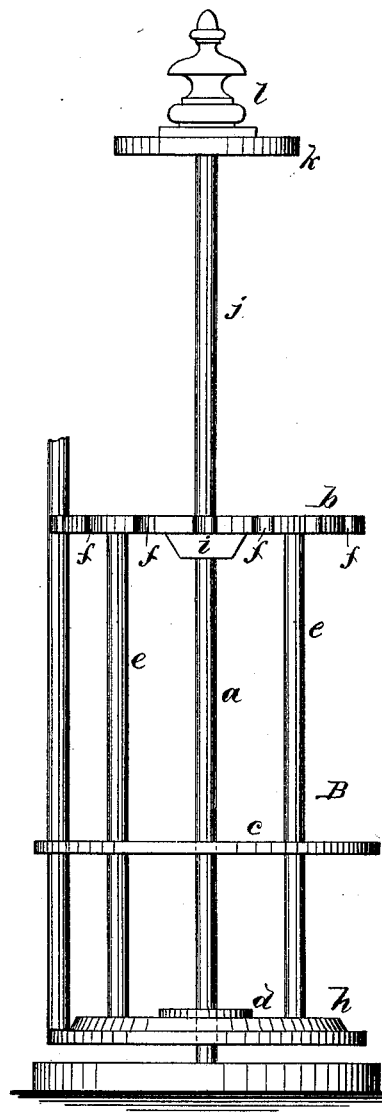
Figure 2:
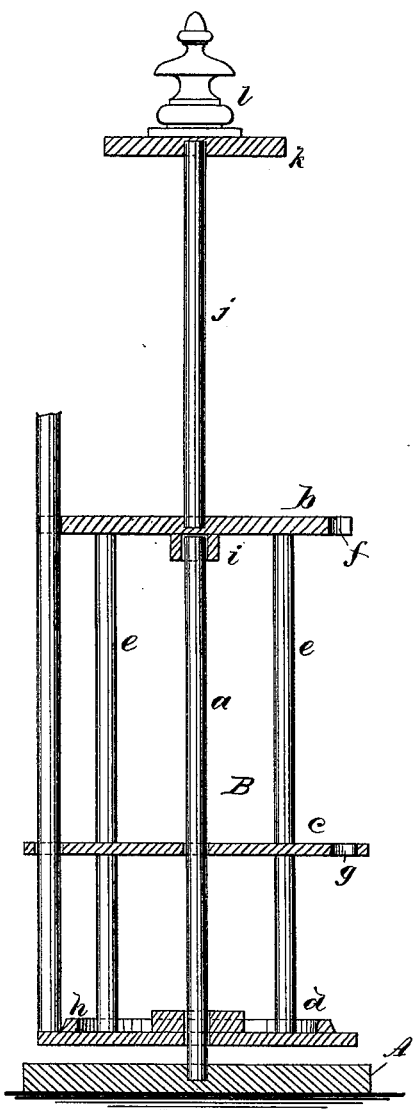
Figure 3:
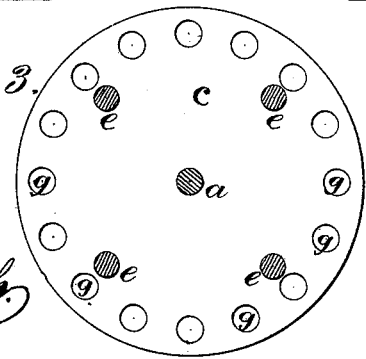

Be it known that I, SYLVESTER W. SHELDON, of the city, county, and State of New York, have invented a new and Improved Broom-Rack, of which the following is a specification:

Figure 1 is a side elevation of my improved broom-rack. Fig. 2 is a central vertical section of the same. Fig. 3 is a horizontal section.

Similar letters of reference indicate corresponding parts.

The invention will first be described in connection with the drawing, and then pointed out in the claim.

Referring to the drawings, A is the base-piece that supports the standard $a$. B is a rack, consisting of the disks $b\ c\ d$, secured to rods $e$ a suitable distance apart.

In the edge of the upper disk $b$ U-shaped notches $f$ are formed, and near the edge of the middle disk $c$ there are apertures $g$, which correspond in position to the notches in the disk $b$.

Upon the upper surface of the disk $d$ an inclined ledge, $h$, is formed, which is in line with the inner side of the holes $g$ and notches $f$, so that when a broom-handle is put through the holes $g$ and placed on the lower disk $d$, the inclined surface of the ledge $h$ will throw the lower end of the handle outward, causing its upper end to rest in one of the notches $f$.

The disks $c\ d$ are apertured to receive the standard $a$, and an apertured block, $i$, is secured to the under surface of the disk $b$, to receive the upper end of the said standard.

The disk $b$ is bored partly through from its upper side to receive a standard, $j$, carrying at its upper end a disk, $k$, for receiving pins or hooks for small brushes, &c., and an ornamental top, $l$.

When it is not essential that the rack B should turn, square or oblong boards may be substituted for the disks $b\ c\ d$, which may be provided with notches, apertures, and a beveled ledge, as in the case of the circular rack.

Having thus described my invention, I claim as new and desire to secure by Letters Patent—

A broom-rack consisting of three rod-connected disks, the upper having notches $f$, the middle one having holes $g$, and the lowest disk having a beveled ledge, $h$, as shown and described.

SYLVESTER W. SHELDON.

Witnesses:
C. SEDGWICK,
ALEX. F. ROBERTS.